Figure 5:
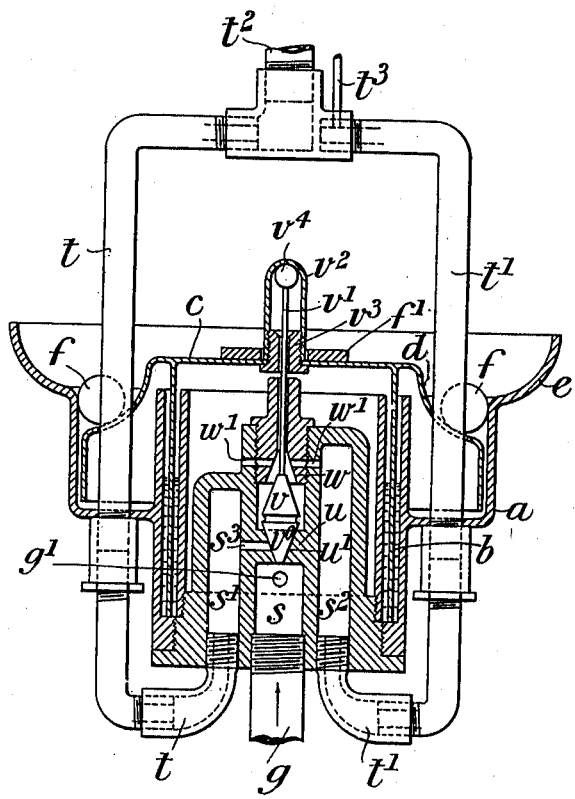

E. W. BLAKE.
GAS CONTROLLER OR REGULATOR.
APPLICATION FILED MAR. 25, 1910.
982,702.
Patented Jan. 24, 1911.
3 SHEETS—SHEET 1.
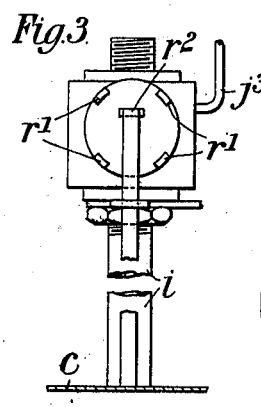
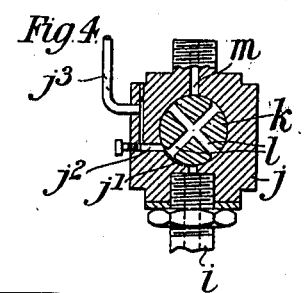
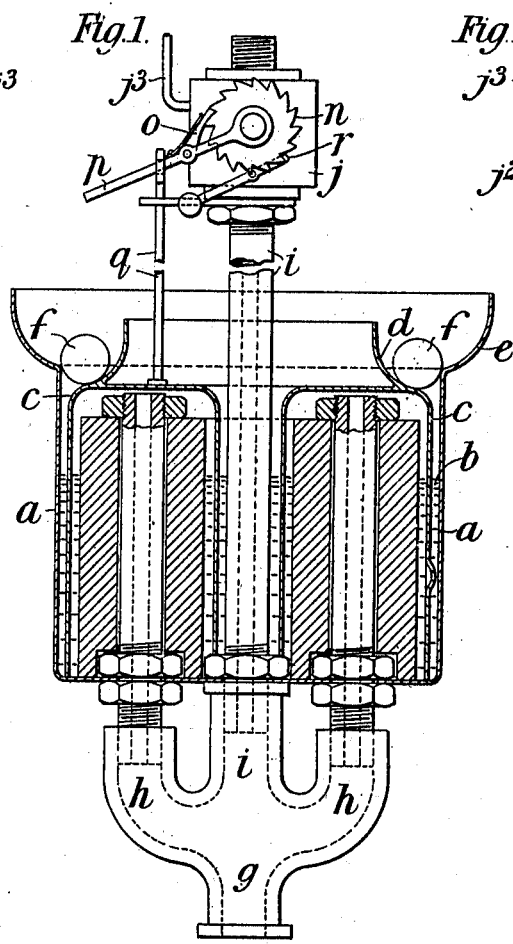
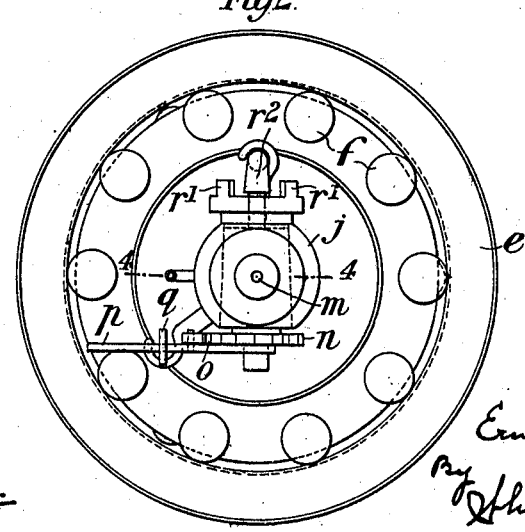
Witnesses.
J. K. Moore
R. E. Barry.
Inventor.
Ernest H. Blake.
By Whitaker & Prevost
attys.

E. W. BLAKE.
GAS CONTROLLER OR REGULATOR.
APPLICATION FILED MAR. 25, 1910.

982,702.

Patented Jan. 24, 1911.
3 SHEETS—SHEET 2.

Witnesses.
J. K. Moore
R. E. Barry.

Inventor.
Ernest W. Blake
By Whitaker Prevost
attys.

E. W. BLAKE.
GAS CONTROLLER OR REGULATOR.
APPLICATION FILED MAR. 25, 1910.

982,702.

Patented Jan. 24, 1911.
3 SHEETS—SHEET 3.

UNITED STATES PATENT OFFICE.

ERNEST WILLIAM BLAKE, OF SOUTH CROYDON, ENGLAND.

GAS CONTROLLER OR REGULATOR.

982,702.     Specification of Letters Patent.     Patented Jan. 24, 1911.

Application filed March 25, 1910. Serial No. 551,453.

*To all whom it may concern:*

Be it known that I, ERNEST WILLIAM BLAKE, a subject of the King of Great Britain, residing at 22 Temple road, South Croydon, Surrey, England, have invented new and useful Improvements in Gas Controllers or Regulators, of which the following is a specification.

My invention relates to improvements in gas controllers or regulators chiefly designed for use in connection with street lamps, although also applicable for other purposes. In such controllers or regulators as hitherto generally made, the gas valve is opened so as to turn on the supply to the burner by raising the pressure of the gas in the supply main to a certain predetermined point, the said valve being closed so as to extinguish the gas by again raising the pressure of the gas in the gas main to the same pressure as that required for turning on the valve. A device has also been proposed in which it is possible to extinguish the gas without raising the pressure of the gas in the gas main to the same high point required for turning on the gas, but this device is open to objections in practice, chiefly owing to the fact that it does not operate the gas valve directly, but indirectly through the medium of mechanism, which is of somewhat complicated construction and involved in operation.

Now, my invention has for its object to provide a controller or regulator by means of which the gas can be extinguished without raising the pressure in the gas main to the high point which is necessary for turning on the gas and which, at the same time, acts directly upon the gas valve, thereby obviating the necessity of employing any complicated intermediate mechanism, and consequently considerably simplifying the construction and improving the efficiency of devices of this kind.

To this end, according to my invention, I proceed as follows, that is to say, I provide a container for a suitable liquid, such as mercury, in which is immersed a gas-bell, into the interior of which a pipe from the gas supply main opens. This gas bell is loaded in any convenient manner so that the gas bell does not rise until the pressure in the main has reached a certain predetermined point. When this point is reached, the said bell rises and on its upward movement it is automatically freed of the load which it bears, and also opens the gas valve by a direct connection therewith. Means are also provided for retaining the gas bell in the partially raised position independently of the gas pressure, so that as the said pressure drops, under the normal varying fluctuations in pressure in the gas main, the bell does not fall, and can be again raised by a slight increase in pressure considerably lower than that which is necessary for lifting it for turning on the valve, owing to the fact that it is not loaded. This second rise of the bell further turns the controlling valve of the gas burner so as to extinguish the gas, whereupon the bell drops under its own weight and the load is again brought to bear upon it.

To enable the invention to be fully understood I will describe it by reference to the accompanying drawings, in which:—

Figure 1 is a sectional elevation of a form of gas controller or regulator embodying my invention. Fig. 2 is a plan view thereof. Fig. 3 is a view of the upper part of the device seen from the side opposite to that shown in Fig. 1. Fig. 4 is a section on the line 4—4, Fig. 2, and Figs. 5 and 6 are sectional elevations of modified forms of controller or regulator.

Referring first to the regulator or controller illustrated in Figs. 1 to 4, the device there shown comprises an annular container $a$ which is partly filled with a liquid such as mercury, as indicated at $b$, and into which liquid there dips an annular bell $c$. The upper part of the bell $c$ is provided with the inclined or curved neck $d$ and the upper part of the casing $a$ with an expanded channel $e$. $f, f$ represent a series of balls which are placed around the neck $d$ of the bell $c$ and form the load hereinbefore referred to. $g$ is the gas supply pipe, the said pipe having three branches, two of which $h, h$, pass up through the bottom of the annular casing $a$ and the third $i$ extends through the center of the annular bell $c$ and projects beyond the upper end thereof, the said upper end being fitted with the cock $j$; this cock $j$ is provided with a plug $k$ formed with the gas passages $l, l$ designed to place the gas supply pipe $i$ in communication with the supply passage $m$ in the cock casing. The cock $j$ is also provided with a passage $j'$ connecting the pipe $i$ with a passage $j^2$ communicating with a by-pass burner $j^3$. The plug $k$ of the cock has fitted to it outside the casing the ratchet wheel $n$ with which engages the pawl $o$ pivoted upon the arm $p$ which is itself pivoted axially with the cock-plug $k$. The arm $p$ engages with an eye or stirrup upon the upper end of a rod $q$ the lower end of which is attached to the upper part of the annular gas-bell $c$. $r$ is a detent which prevents the backward movement of the ratchet wheel $n$. $r'$, $r'$ are stops on a disk carried by the plug $k$ and serving, when the said plug is rotated as hereinafter described, to support the bell $c$ in a raised position by being interposed in the path of a catch $r^2$ carried by the said bell. With this construction, when the pressure in the gas main has reached the predetermined point, the bell $c$ is caused to rise, and as it rises, the balls $f$, $f$ upon the inclined neck thereof, slide by gravity down the said neck and rest upon the channel $e$, thus relieving the bell of their weight. The upward movement of the bell $c$ actuates the aforesaid pivoted pawl $o$ which turns the gas valve so as to open the same and permit the gas to pass through the supply pipe $i$ to the gas burner. On the fall of pressure in the gas main, the bell $c$ drops, but is prevented from descending to the bottom of its stroke by contact of the catch $r^2$ with one of the stops $r'$ carried by the plug $k$ which stop has been brought into the operative position by the movement of the said cock when turned by the ascending bell. The bell $c$ is retained in this position until the pressure in the gas main is raised sufficiently to lift it from the supporting stop, this further upward movement again turning the gas cock so as to extinguish the gas and at the same time move the supporting stop out of the path of the said bell, which is therefore free to descend. As it nears the lower end of its stroke the balls $f$, $f$ again roll on to the inclined neck $d$ and thus reinstate the load which prevents the ball from rising until the pressure in the gas main again reaches the predetermined higher point.

In Fig. 5 there is shown a modified form of controller or regulator constructed according to the invention. In this form of apparatus the gas valve or cock is located centrally within the annular casing $a$, the casing of the said valve or cock being fixed to the bottom of the said annular casing. In this valve casing is formed a central passage $s$ into which the gas supply pipe $g$ opens and which is in communication by means of lateral holes $g'$ with the interior of the gas-bell $c$ and outer passages $s'$, $s^2$ which communicate respectively with branch pipes $t$, $t'$ connected to the burner pipe $t^2$ and by-pass $t^3$. The passage $s$ of the valve casing is provided with a transverse wall or partition $u$ having a conical seating $u'$ in communication by a port or passage $s^3$ with the passage $s'$, this conical seating $u'$ being designed to receive the lower cone $v^0$ of the double conical valve $v^0$ $v$, having a stem $v'$ which extends upward through the valve casing and into a tubular extension or cap $v^2$ of the bell $c$ which is secured to the latter in a gas-tight manner and is provided at its lower end with a plug $v^3$ through which the stem $v'$ passes. At its upper end the stem is fitted with a ball or enlargement $v^4$. The upper cone $v$ of the valve is designed to coöperate with a seating $w$ provided with the passage $w'$ which places the interior of the bell $c$ in communication with the space $s^2$ for supplying gas to the by-pass $t^3$ when the valve $v^0$ is closed. This form of the apparatus operates as follows:—that is to say, assuming that the gas bell $c$ be in its lowermost position as shown in the drawing, in which position it is loaded by means of the balls $f$ and that the pressure in the gas main be raised to the predetermined point, the bell $c$ is lifted, the balls $f$ as the said bell rises, being caused to pass into the channel $e$ on the casing $a$ thereby relieving the bell $c$ of their weight. As the bell $c$ rises it lifts the cap $v^2$ and consequently the plug $v^3$ which comes into contact with the ball $v^4$ upon the upper end of the valve stem $v'$ thus lifting the valve $v^0$ from its seat and opening communication between the gas pipe $g$ and the branch pipe $t$ through the passage $s^3$. The upward movement of the valve $v^0$ also brings the upper conical portion $v$ of the valve against the seating $w$ thereby closing the by-pass passage $w'$, or, in other words, cutting off the supply of gas to the by-pass $t^3$. As the bell $c$ is relieved of the pressure of the weights $f$ it remains in its uppermost position throughout the lighting hours, notwithstanding the variation of pressure of gas in the supply main, which practically does not affect it while thus unloaded. To extinguish the gas, the pressure in the gas main $g$ is lowered to a predetermined point thus causing the bell $c$ to drop to a certain extent, that is to say, until the top of the cap or sleeve $v^2$ comes into contact with the ball $v^4$ upon the upper end of the valve stem $v'$, at about which moment the balls $f$ have again rolled by gravity on to the neck of the said bell thereby accelerating the fall of the latter which brings the lower cone $v^0$ of the valve again on to its seat and releases the upper cone $v$ from its seat, thus shutting off the supply of gas to the passage $s^3$ and opening the passage $w'$ to the by-pass. $f'$ is a weight applied to the top of the bell $c$ and one or more of which is or are used in cases where the weight of the bell $c$ alone is insufficient to cause it to drop at the predetermined extinguishing pressure.

Figure 6:
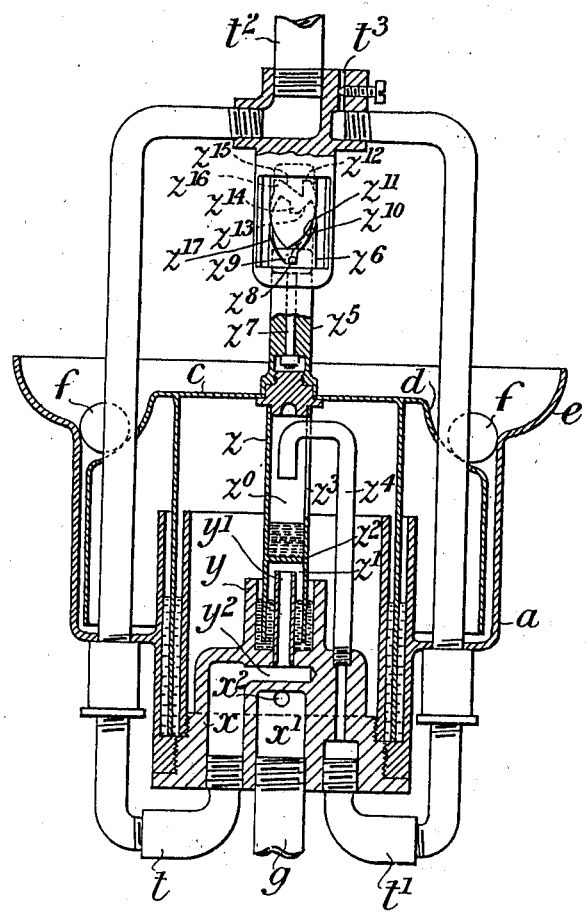

Fig. 6 illustrates a further modified form of controller or regulator, wherein the gas valve or cock is situated centrally within the annular casing $a$. The casing $x$ of the valve is fixed to the bottom of the annular casing $a$ as in the modification illustrated in Fig. 5, and is formed with the central passage $x'$ into which the gas supply pipe $g$ opens and which is in communication by lateral holes $x^2$, with the interior of the gas-bell $c$. Above the central passage $x'$ there is provided an upper chamber or cup $y$ which contains mercury, a tube $y'$ extending centrally through the said chamber $y$ and communicating at its lower end with the passage $y^2$, which extends to a pipe $t$ in communication with the main burner tube $t^2$. Into the mercury contained in the chamber or cup $y$ there dips a tube $z$ which is divided into two compartments, $z^0$ and $z'$ by a transverse partition $z^2$, the lower compartment $z'$ dipping into the mercury and inclosing the aforementioned tube $y'$. The upper compartment $z^0$ of the tube $z$ also contains mercury and is in communication with the interior of the bell $c$, by the opening $z^3$. This opening $z^3$ is in the form of a slot through which there extends a tube $z^4$ connected at its lower end to the pipe $t'$ passing to the by-pass $t^3$ of the burner and at its upper end enters the compartment $z^0$ of the tube $z$, the extremity within the said compartment being turned downward as clearly shown. With this construction on the bell $c$ rising the compartment $z'$ of the tube $z$ is lifted from the mercury seal in the chamber or cup $y$ so as to permit gas to flow from the bell $c$ down through the tube $y'$ and into the passage $y^2$ to the pipe $t$, and thence to the burner tube $t^2$. The rising of the bell $c$ also causes the mercury in the compartment $z^0$ of the tube $z$ to seal the lower inner end of the pipe $z^4$, so that the passage of gas to the by-pass $t^3$ is cut off. On the bell falling, the pipe $z^4$ is unsealed and the tube $y'$ is sealed so that gas can then pass from the bell $c$ into the pipe $z^4$ and thence through the pipe $t'$ to the by-pass tube $t^3$. In order that the bell $c$, can be prevented from descending after the pressure of the gas has been raised to lift it to turn on the gas to the burner and until the pressure is again raised, as in the arrangement described with reference to Figs. 1 to 4, I provide at the upper end of the said bell an upwardly extending tubular rod $z^5$ designed to slide in a tube $z^6$ carried upon the burner tube $t^2$. Within the rod $z^5$ is arranged a spindle $z^7$ which is free to turn in the said rod and carries at its upper end a pin $z^8$ located in a notch $z^9$ in an irregularly shaped endless groove $z^{10}$ in the tube $z^6$ when gas is passing to the by-pass $t^3$. As the bell $c$ rises when the pressure is raised the pin $z^8$ rides against the inclined surface $z^{11}$ of the groove $z^9$ in the direction of the arrow until it reaches the surface $z^{12}$ when, on the pressure falling, the said pin will be guided by the inclined surface $z^{13}$ into the notch $z^{14}$ where it will be supported and maintain the bell in the raised position. When the pressure of the gas is again raised the pin $z^8$ will be lifted out of the notch $z^{14}$ and ride against and be guided by the inclined surface $z^{15}$ into the notch $z^{16}$ and on the pressure being again lowered the said pin will be guided by the inclined surface $z^{17}$ back to the notch $z^9$ ready for the operation to be repeated.

Having now fully described and ascertained my said invention and the manner in which it is to be performed, I declare that what I claim is:—

1. In apparatus of the kind described, the combination with a burner, of means for supplying gas to said burner comprising a casing outwardly flanged at its upper edge, a gas bell movably mounted within said casing and adapted to be raised and lowered by variations of gas pressure, said bell being provided with a channel at its upper edge, weight balls located in said channel, the said channel and flange being so related to each other that when the gas bell rises a certain distance the balls move from the channel to the flange, thereby relieving the bell of their weight.

2. In apparatus of the kind described, the combination with the gas bell, of an internal valve casing having a passage in connection with the gas supply and with the gas bell, a cup containing a sealing fluid and traversed by an open tube in communication with the burner tube and a tube depending within the gas bell and divided into two compartments, one of which dips into the cup containing sealing fluid and incloses the open tube therein and the other of which is in communication with the gas bell and also contains a sealing fluid, adapted to seal the inner end of a tube in communication with the by-pass tube of the burner.

ERNEST WILLIAM BLAKE.

Witnesses:
  C. G. REDFERN,
  A. ALBUTT.